(12) United States Patent
Grohn et al.

(10) Patent No.: US 6,810,270 B1
(45) Date of Patent: *Oct. 26, 2004

(54) PROVIDING REFERENCE SIGNAL TO RADIO HEADS

(75) Inventors: Ossi Ilari Grohn, Apex, NC (US); Anthony Salvatore Fugaro, Holly Springs, NC (US); Michael Francis Marlborough, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 708 days.

This patent is subject to a terminal disclaimer.

(21) Appl. No.: 09/705,093

(22) Filed: Nov. 2, 2000

(51) Int. Cl.$^7$ ................................................. H04B 1/38
(52) U.S. Cl. ........................ 455/560; 455/561; 455/502
(58) Field of Search ............................. 455/562.1, 561, 455/422, 560; 370/360, 514, 509, 310, 465; 340/870.16, 870.11

(56) References Cited

U.S. PATENT DOCUMENTS

| | | | |
|---|---|---|---|
| 5,361,294 A | | 11/1994 | Lee et al. |
| 5,388,102 A | | 2/1995 | Griffith et al. |
| 5,555,260 A | | 9/1996 | Rinnback et al. |
| 5,812,951 A | * | 9/1998 | Ganesan et al. ............ 455/445 |
| 5,930,722 A | * | 7/1999 | Han et al. ................... 455/502 |
| 6,101,400 A | * | 8/2000 | Ogaz et al. ................. 455/561 |
| 6,175,575 B1 | * | 1/2001 | Ahuja et al. ................ 370/524 |
| 6,185,429 B1 | | 2/2001 | Gehrke et al. |
| 6,256,505 B1 | * | 7/2001 | Kingdon et al. ......... 455/456.2 |
| 6,336,041 B1 | | 1/2002 | Vatalaro et al. |
| 6,377,575 B1 | * | 4/2002 | Mullaney et al. ........... 370/360 |
| 6,441,747 B1 | * | 8/2002 | Khair et al. ........... 340/870.16 |
| 6,597,912 B1 | * | 7/2003 | Lu et al. ..................... 455/445 |
| 6,628,968 B1 | * | 9/2003 | Grohn ........................ 455/560 |

FOREIGN PATENT DOCUMENTS

WO  WO 94/28690  12/1994

OTHER PUBLICATIONS

Kessner, David, "Design of a Time–Slot–Interchanger and Other TDM bus Interfacing Issues," IEEE, May 1998, pp. 515–521.

Lev, Valy; Schaeffer, Dennis; Spear, Stephen; "Development of Mobile Communications Systems in a World of Standards: A Case Study," 11312 MRC Mobile Radio Conference, Nov. 13–14–15, 1991, Nice, FR, pp. 145–150.

\* cited by examiner

*Primary Examiner*—Nay Maung
*Assistant Examiner*—Tilahun B. Gesesse
(74) *Attorney, Agent, or Firm*—Coats & Bennett, P.L.L.C.

(57) ABSTRACT

A method and apparatus for supplying a timing signal from a central unit to at least one radio head connected to the central unit via a communications link. An external signal, typically generated by a MSC, is received at a first framer of the central unit and the first framer generates a reference clock signal based thereon. This reference clock signal is used as the transmit clock for a second framer, known as the radio head framer. The radio head framer transmits a radio head downlink signal to the radio head(s) via the communications link. The radio head downlink signal typically includes payload information and an associated timing reference signal, typically in the form of an embedded clock signal. This timing reference signal of the downlink is based on the reference clock signal from the first framer, rather than being based on a clock signal from an oscillator within the central unit. The transceivers within the radio head(s) may then control their RF transmissions using the timing reference signal from the radio head framer of the central unit. Accordingly, the radio head(s) are provided with a timing reference signal that is based relatively directly on the signal from the MSC.

30 Claims, 3 Drawing Sheets

PROVIDING REFERENCE SIGNAL TO RADIO HEADS

BACKGROUND OF THE INVENTION

The present invention relates to the provision of reference signals to one or more radio heads.

Many wireless communication systems include one or more radio heads connected to a central unit by a wire based communications link, such as a T1 or E1 line. These high speed, high bandwidth lines typically do not include a separate clock line, but may nevertheless still be used to provide timing reference signals for phase locked loops within the radio heads. The phase locked loops are in turn used to perform a wide variety of tasks, such as carrier frequency synthesis. In general, the performance of the radio head, and, in particular, the accuracy of the carrier frequency transmitted by the respective transceivers, may vary depending on the timing accuracy of the timing reference signal provided to the radio head. Accordingly, it is desirable to supply accurate timing reference signals to the radio heads.

BRIEF SUMMARY OF THE INVENTION

The present invention provides a method and apparatus for supplying a timing signal from a central unit to at least one radio head connected to the central unit via a communications link. An external signal, typically generated by a MSC, is received at a reference framer of the central unit and the reference framer generates a reference clock signal based thereon. This reference clock signal is used as the transmit clock for a second framer, known as the radio head framer. The radio head framer transmits a downlink signal to the radio head(s) via the communications link. The downlink signal may include payload information and an associated timing reference signal, typically in the form of an embedded clock signal. This timing reference signal of the downlink is based on the reference clock signal from the reference framer, rather than being based on a clock signal from an oscillator within the central unit. The transceivers within the radio head(s) may then control their RF transmissions using the timing reference signal of the downlink from the radio head framer of the central unit. Accordingly, the radio head(s) are provided with a timing reference signal that is based relatively directly on the signal from the MSC, thereby providing fewer opportunities for error introduction.

DETAILED DESCRIPTION OF THE INVENTION

The present invention is directed to provision of a timing reference to radio heads; however, an understanding of an entire communications system may be helpful in understanding the context of the present invention. While the following discussion may be couched in terms of a communication system using the TIA/EIA-136 protocol, it should be appreciated that the present invention is not limited thereto and is instead equally applicable to communications systems operating according to a wide variety of protocols, including Global System for Mobile Communication (GSM) and Code Division Multiple Access (CDMA) systems.

Figure 1:
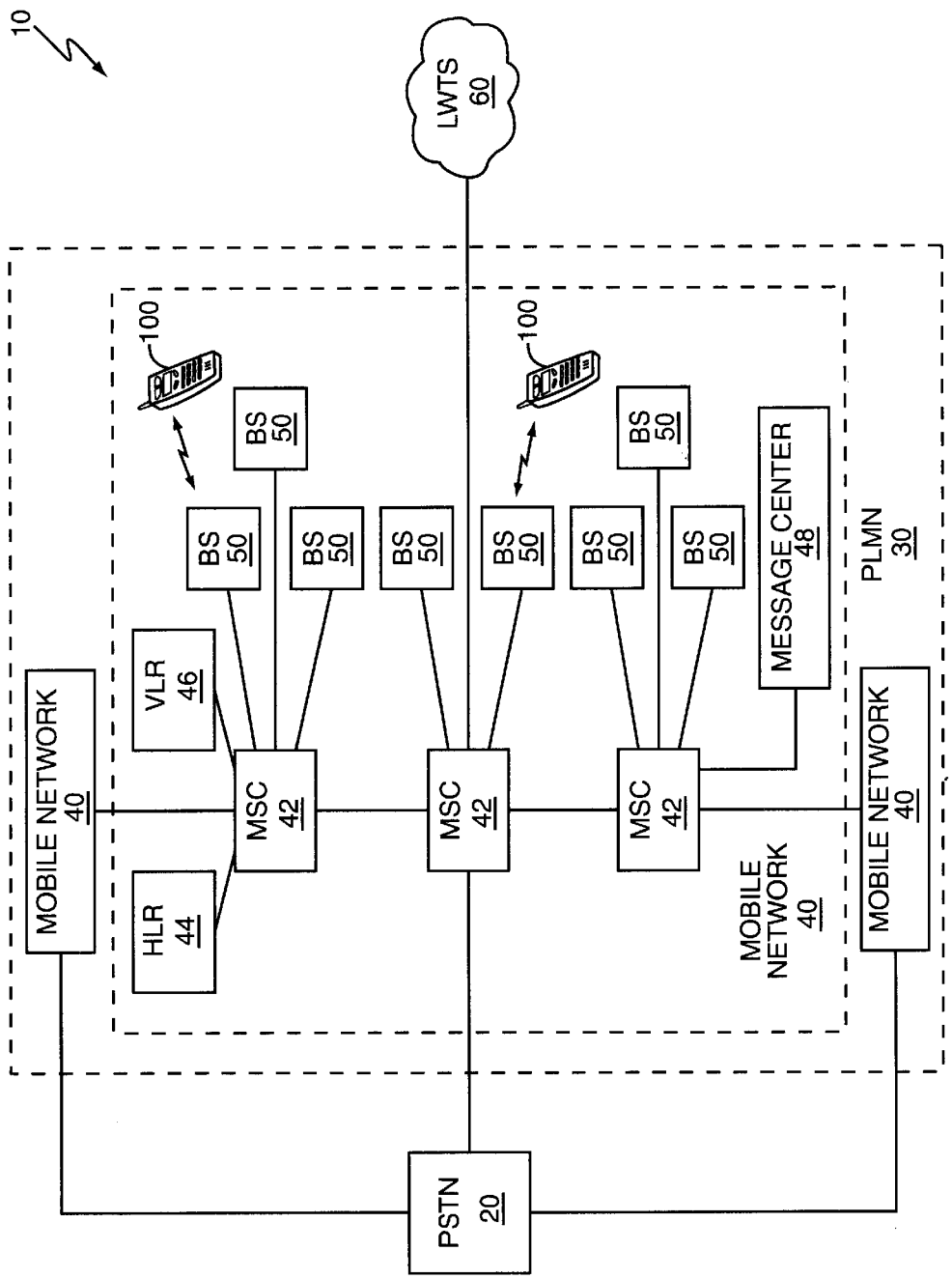
FIG. 1 shows a wireless communication system.

Turning now to FIG. 1, a communication system 10 is illustrated. In particular, the communications system 10 includes the Public Switched Telephone Network (PSTN) 20 and the Public Land Mobile Network (PLMN) 30, which may, in turn, be connected to one or more Localized Wireless Telephone Systems (LWTS) 60. While not shown, satellites may be used as needed either within the PSTN 20 or the PLMN 30 to provide remote communication links, such as across oceans or the like.

The operation of the PSTN 20 is well established and subject to extensive documentation beyond the scope of the present invention and therefore a more detailed discussion is omitted.

PLMN 30 may include a plurality of proprietary mobile networks 40, and each mobile network 40 may include a plurality of Mobile Switching Centers (MSC) 42. Typically, at least one MSC 42 in the PLMN 30, and more advantageously one MSC 42 in each mobile network 40, is connected via a gateway to the PSTN 20. Some MSCs 42 may also serve as gateways connecting the various mobile networks 40 within the PLMN 30. Gateway functions may be all consolidated at a single MSC 42 within a mobile network 40 or dispersed amongst a plurality of MSCs 42 within a mobile network 40 as needed or desired. Typically, at least one MSC 42 within a particular mobile network 40 connects to, or includes, a Home Location Register (HLR) 44 and a Visitor Location Register (VLR) 46, whose functions are well known in the art. Additionally, each mobile network 40 may be equipped with a message center 48 communicatively connected to an MSC 42 for handling short message service and the like. Each MSC 42 may further be communicatively connected to a plurality of base stations 50. Each base station 50 may be communicatively connected to one or more mobile terminals 100, typically over an RF communications channel.

The LWTS 60 is a wireless telecommunications system that may be public or proprietary as needed or desired, and is typically a private network installed in a building or on a campus. LWTSs 60 are typically installed to allow employees working in the building or on the campus to use a mobile terminal 100 as an office telephone. LWTS 60 typically connects with an MSC 42 in the PLMN 30 to allow subscribers of the LWTS 60 to move seamlessly between the LWTS 60 and the PLMN 30. The MSC 42 responsible for a LWTS 60 may treat the LWTS 60 merely as another base station 50 or a plurality of base stations 50 depending on the internal structure of the LWTS 60 in question. One of many configurations of a LWTS 60 is shown in more detail in FIG. 2.

Figure 2:
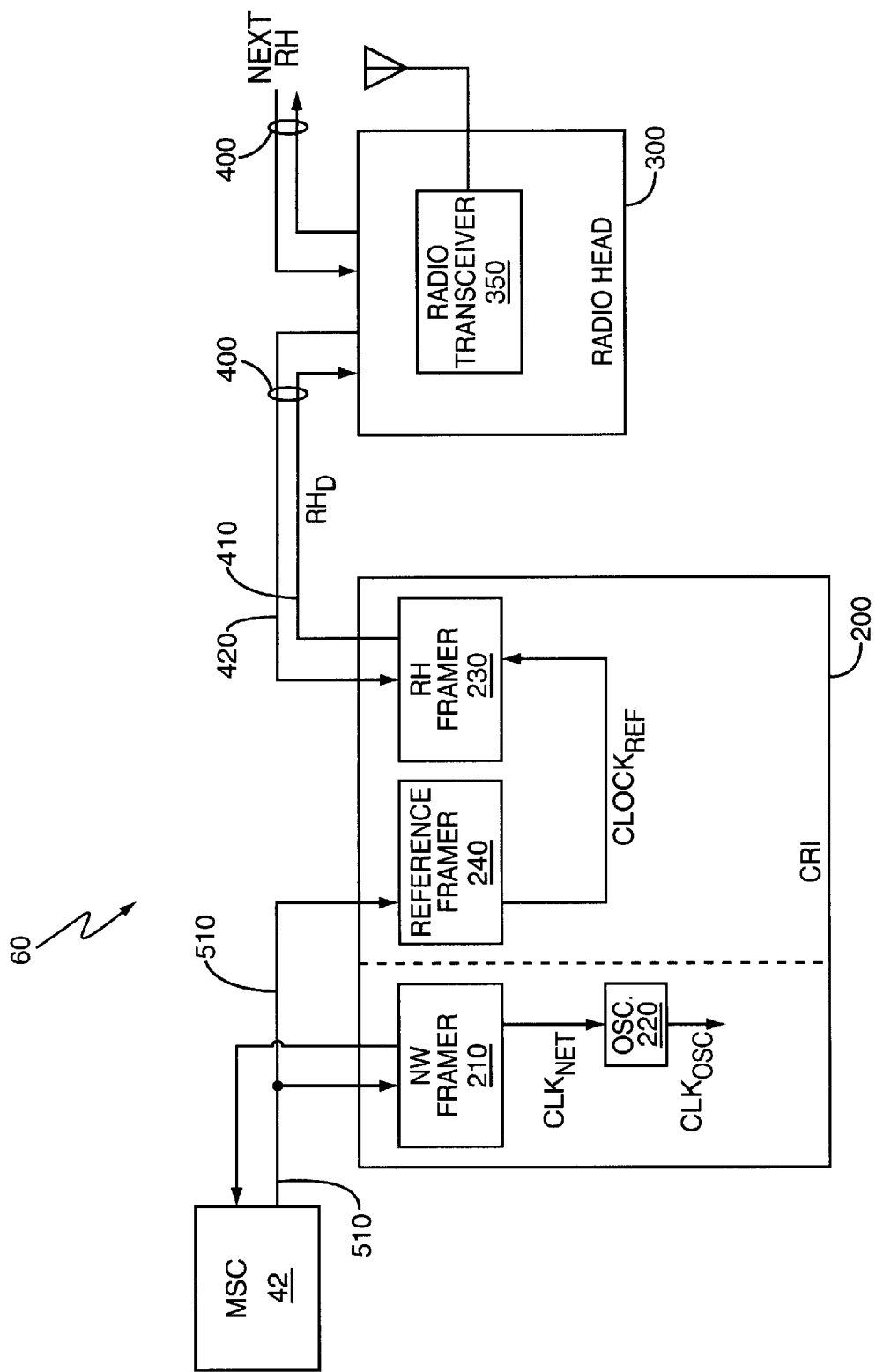
FIG. 2 shows one configuration of a Localized Wireless Telephone System suitable for practicing the present invention.

The LWTS 60 of FIG. 2 includes a control and radio interface (CRI) 200 connected to one or more radio heads (RH) 300. While only one radio head 300 is depicted in FIG. 2, it should be understood that multiple radio heads 300 may be, and typically are, employed, with the radio heads 300 arranged in one or more chains connected to the CRI 200. Each radio head chain may have a serial (cascaded) or parallel configuration, as appropriate. The radio heads 300 communicate with the CRI (or "central unit") 200 via a communications link 400 that may be conceptually be thought of as having downlink 410 (CRI to radio head) and uplink 420 (radio head to CRI) portions. The communications link 400 typically takes the physical form of one or more T1 or E1 lines, but may take other forms known in the art. It should be noted that T1 and E1 lines typically employ pulse code modulation, but the communications link 400 may employ other modulation techniques as is known in the art.

Radio head 300 transmits RF telecommunications signals to mobile terminals 100 using associated transceiver 350, based at least in part on the information signals provided by the CRI 200 via the downlink 410. In addition, radio head 300 receives RF signals from mobile terminals 100 and forwards the same to the CRI via the uplink 420. For additional details regarding the overall function and configuration of radio heads 300, see U.S. patent application Ser. No. 09/666,446, filed 21 Sep. 2000 and entitled "Cascaded Parallel Phase Locked Loops," which is incorporated herein to the extent it does not conflict with the present disclosure. For purposes of understanding the present invention, it should be noted that the radio head downlink signal ($RH_d$) from the CRI 200 is input to the radio head 300 where it is typically segregated into a clock signal and a payload signal. The clock signal is used to help control the RF transmissions from the radio head's transceiver 350, such as by providing a reference for generating a carrier frequency and/or timing synchronization. Most cellular communications standards typically require a long-term accuracy of 0.016 ppm, or Stratum 2, for the clock signal provided to the CRI 200 from MSC 42, in order that the proper accuracy may be achieved by the transceivers 350 of the radio heads 300. Accordingly, because the radio heads 300 use the radio head downlink signal $RH_d$ supplied by the CRI 200 to generate appropriate internal clock signals to, inter alia, control RF transmissions from the radio head's transceiver 350, the quality of the clock signal supplied by the CRI 200 via the downlink portion 410 of the communications link 400 may influence the performance of the radio head 300. Thus, providing accurate timing signals to the radio head 300, via downlink 410, is desirable.

The CRI 200 serves primarily as the interface between the MSC 42 and the radio heads 300. The CRI 200 may oversee or perform the functions of control of air channels, control of radio heads 300, routing of data to and from the radio heads 300, and the like. Most of these functions are well known in the art and are not discussed further herein. Relevant to the present invention, the CRI 200 provides timing reference signals to the radio heads 300, such as for air frame synchronization and carrier frequency reference. For simplicity in explaining the present invention, primarily those CRI components related to providing the timing reference are shown in FIG. 2, but the CRI 200 of FIG. 2 is to be understood to include other functional components known in the art. The CRI 200 includes a network (NW) framer 210, an oscillator 220, one or more radio head (RH) framers 230, and a reference framer 240. The network framer 210 receives input, sometimes referred to herein as the "external signal," from the MSC 42 via E1/T1 downlink 510 and processes that external signal in a conventional fashion to extract payload information and an associated embedded clock signal. It should be noted that the embedded clock signal from the MSC 42 typically meets the requirements of Stratum 2 (0.016 ppm), and may meet the higher standard of Stratum 1 (0.01 ppb). The network framer 210 outputs a payload signal and a clock signal ($Clock_{net}$) based on the external signal. The payload signal is directed to the appropriate portions of the CRI 200 for internal data processing, as is known in the art. The $Clock_{net}$ signal is sent to the oscillator 220, typically a phase locked loop, for generation of the CRI internal clock signal $Clock_{osc}$. This $Clock_{osc}$ signal may be used in a conventional fashion to control various processes within the CRI 200, such as the processing of the payload information within the CRI 200 and optionally as a transmit clock for uplink transmissions to the MSC 42 from network framer 210. It should be noted that the generation of internal clock signal $Clock_{osc}$ by oscillator 220 may allow the introduction of errors into $Clock_{osc}$ that are not present in $Clock_{net}$.

The input from the MSC 42 via downlink 510 is also directed to the reference framer 240. The reference framer 240 extracts the embedded clock from the signal sent by the MSC 42 via the corresponding E1/T1 downlink 510 to produce a clock signal that will be referred to as the reference clock signal $Clock_{ref}$. There is no need for the reference framer 240 to generate a payload signal for internal use within the CRI 200, as this is handled by the network framer 210. As such, the reference framer 240 may operate in a monitoring mode, meaning that the reference framer 240 should present high impedance to downlink 510 so as to not overload downlink 510.

The radio head framer 230 operates in a conventional fashion to send information signals to radio heads 300 for subsequent transmission by the corresponding transceivers 350, etc. The information signals transmitted by the radio head framer 230 includes at least a portion of the payload information extracted by the network framer 210 and an associated downlink clock signal. For purposes of the following discussion, it will be assumed that the downlink clock signal is embedded in the information signal, with the combined signal from the CRI 200 to the radio head 300 being called the radio head downlink signal $RH_d$. However, the downlink clock signal may be transmitted to the radio head 300 in other ways, such as a separate line, but doing so is believed less efficient. The embedded clock signal generated by the radio head framer 230 is controlled by the transmit clock signal supplied to the radio head framer 230. In the prior art, the oscillator 220 supplied the $Clock_{osc}$ signal as the transmit clock signal for the radio head framer 230. As such, the accuracy of the transmit clock signal supplied to the radio head framer 230 was a function of the accuracy of the oscillator 220. In the present invention, the reference clock signal $Clock_{ref}$ generated by the reference framer 240 is instead used by the radio head framer 230 as its transmit clock signal. As shown in FIG. 2, the reference clock signal $Clock_{ref}$ from the reference framer 240 is fed directly to radio head framer 230 as the transmit clock signal therefor. As such, the downlink clock signal embedded in the radio head downlink signal $RH_d$ is based directly on the reference clock signal $Clock_{ref}$. By "directly" Applicants mean that there is not an intervening oscillator (such as a phase lock loop) between the output of the reference framer 240 and the input to the radio head framer 230 (but there may be other electrical components such as switches, etc.). Because the downlink clock signal of the radio head downlink signal $RH_d$ from radio head framer 230 is based directly on the reference clock signal $Clock_{ref}$, the accuracy of the clock signal from the MSC 42 (delivered to CRI 200 via downlink 510) may be forwarded to the radio heads 300 without being impacted by the accuracy of the oscillator 220 in the CRI 200. Accordingly, under the present invention, the radio heads 300, and their transceivers 350, are provided with a clock signal that is based more directly on the signal from the MSC 42 than in the prior art. In short, the present invention allows the clock signal sent to the radio heads 300 to be generated by the CRI 200 without the need to pass through the CRI's oscillator 220. This arrangement may reduce the amount of error that may exist in the clock signal sent to the radio heads 300 via downlink 410, increasing long-term accuracy without requiring oscillator 220 to be highly accurate and therefore expensive.

It should be noted that because there is a potential difference between the clock signals in the CRI 200 coming from the oscillator 220 (Clock$_{osc}$) and the reference framer 240 (Clock$_{ref}$), it may be advantageous to employ appropriate slip buffers in the payload processing of the CRI 200. When accumulated long-term drift occurs between the payload processing in the CRI 200 and the downlink transmissions from the CRI 200 to the radio heads 300 via downlink 410, it may also become necessary to retransmit frames on the communications link 400.

Figure 3:
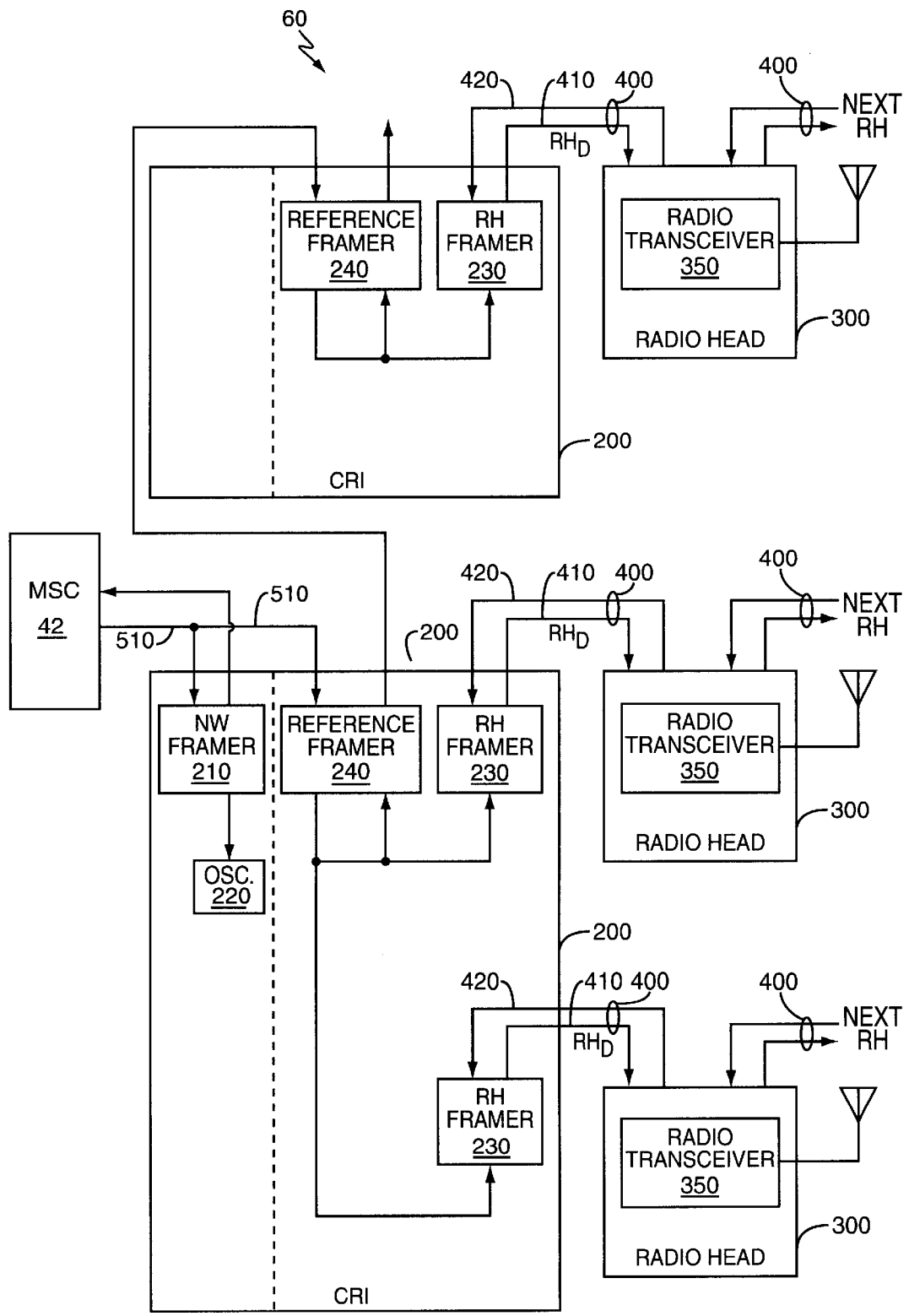
FIG. 3 shows another configuration of a Localized Wireless Telephone System suitable for practicing the present invention.

FIG. 2 shows a single CRI 200 connected to one chain of radio heads 300; this chain may contain either only a single radio head 300 or a plurality of radio heads 300. Further, the present invention may be used in other configurations. For instance, the CRI 200 may be connected to more than one chain of radio heads 300, as shown in FIG. 3. In addition, the CRI 200 may also connect to another CRI 200, also as shown in FIG. 3. In this latter case, it may be advantageous to have the reference framer 240 forward clock signal Clock$_{ref}$ to the downstream CRI 200, such as by using the Clock$_{ref}$ as is own transmit clock. That is, both the reference framer 240 and the radio head framer 230 may use the reference clock signal Clock$_{ref}$ as their transmit clocks. The downstream CRI 200 may also advantageously employ the technique of the present invention to generate the clock signal for its radio heads 200 based on the external-to-it signal without the need to pass through an oscillator 220 in the downstream CRI 200.

Further, the discussion above has described the transmit clock input to the radio head framer 230 as being generated by the reference framer 240 (i.e., Clock$_{ref}$). Such an arrangement may be practical in many applications, but is not strictly required. Instead, the transmit clock input to the radio head framer 230 may instead be Clock$_{net}$ generated by the network framer 210. Both arrangements use a framer to derive a clock signal from the external signal supplied via network downlink 510, directly supply that derived clock (Clock$_{ref}$, Clock$_{net}$) to the radio head framer 230 as the transmit clock therefor, without routing through an intervening oscillator 220 in the CRI 200, and base the downlink clock signal (which may, but is not required to be, embedded) supplied to the radio heads 300 on the derived clock (Clock$_{ref}$, Clock$_{net}$). Thus, depending on the configuration, either Clock$_{ref}$ or Clock$_{net}$ may be considered as the reference clock signal supplied to the radio head framer 230 as the transmit clock therefor.

In the discussion above, it was also assumed that the transmit clock signal for the radio head framer 230 of the CRI 200 is continuously derived from the downlink signal on network downlink 510; however, this is not required. Indeed, there may be times when the signal from the MSC 42 to the reference framer 240 may not be present, making generation of Clock$_{net}$/Clock$_{ref}$ difficult. In such situations, it may be possible to derive a transmit clock signal for the radio head framer 230 of the CRI 200 from the uplink portion 420 of the communications link 400, at least temporarily, so as to allow the CRI 200 to gracefully shutdown the radio heads 300 as appropriate. See U.S. patent application Ser. No. 09/704,927, entitled "Providing Timing Reference For Radio Heads," by Ossi Grohn (one of the present inventors) and filed concurrently herewith, which is incorporated herein to the extent it does not conflict with the present disclosure.

It should be noted that, some LWTS 60 may also contain so-called "scanners" that contain RF receivers only, or RF transceivers that function only as receivers. These specialized scanners, if present in the LWTS 60, should typically be supplied with the same timing reference signals as the radio heads 300. As such, it may be advantageous to provide any scanners in the LWTS 60 with timing reference signals similarly as described above.

As used herein, the term "radio head" means an active communications station with at least RF transmit capability that is fed data to be transmitted from an upstream source. Further, as used herein, the term "mobile terminal" 100 may include a cellular radiotelephone with or without a multi-line display; a Personal Communications System (PCS) terminal that may combine a cellular radiotelephone with data processing, facsimile and data communications capabilities; a Personal Digital Assistant that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals 100 may also be referred to as "pervasive computing" devices.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of supplying a timing signal from a central unit to at least one radio head connected to said central unit via a communications link, said method comprising:

generating a reference clock signal based on an external signal by a first framer of said central unit; and transmitting a radio head downlink signal from a second framer to said at least one radio head via said communications link, said radio head downlink signal comprising an embedded clock signal based directly on said reference clock signal.

2. The method of claim 1 further comprising:

receiving said external signal also at a third framer of said central unit, said third framer generating a third clock signal and extracting payload information based on said external signal;

an oscillator in said central unit receiving said third clock signal and generating a fourth clock signal based thereon;

processing said payload information at said central unit based on said fourth clock signal;

wherein transmitting said radio head downlink signal from said second framer to said at least one radio head via said communications link comprises transmitting at least a portion of said payload information from said second framer to said at least one radio head via said communications link.

3. The method of claim 2 further comprising transmitting an RF signal by said at least one radio head based on said radio head downlink signal with timing based on said embedded clock signal.

4. A method of supplying a timing signal from a central unit to at least one radio head connected to said central unit via a communications link, said method comprising:

receiving an external signal at a first framer of said central unit and generating a first clock signal based thereon by said first framer;

routing said first clock signal to a second framer as a transmit clock therefor without going through an intervening oscillator; and transmitting a downlink signal from said second framer to said at least one radio head via said communications link based on said transmit clock.

5. A method of supplying a timing signal from a central unit to at least one radio head connected to said central unit via a communications link, said method comprising:

receiving an external signal at a first framer of said central unit and generating a first clock signal based thereon by said first framer;

using said first clock signal as a transmit clock for a second framer, said second framer transmitting a downlink signal to said at least one radio head via said communications link, said downlink signal comprising a downlink clock signal based on said first clock signal.

6. The method of claim 5 further comprising embedding said downlink clock 1 signal in said downlink signal.

7. The method of claim 5 further comprising:

receiving said external signal also at a third framer of said central unit, said third framer generating a third clock signal and extracting payload information based on said external signal;

receiving, with an oscillator in said central unit, said third clock signal and generating a fourth clock signal based thereon;

processing said payload information at said central unit based on said fourth clock signal; and thereafter, said second framer transmitting at least a portion of said payload information to said at least one radio head via said communications link with said downlink clock signal.

8. The method of claim 5 wherein said external signal comprises a network downlink clock signal having a long-term accuracy of not less than 0.016 parts per million and wherein receiving said external signal at said first framer of said central unit and generating said first clock signal based thereon by said first framer comprises generating said first clock signal with a long-term accuracy of not less than 0.016 parts per million based on said external signal by said first framer.

9. The method of claim 5 further comprising generating said external signal at a MSC.

10. The method of claim 9 further comprising transmitting said external signal from said MSC to said central unit via a T1 communications link.

11. The method of claim 9 further comprising transmitting said external signal from said MSC to said central unit via an E1 communications link.

12. The method of claim 5 further comprising transmitting an RF signal by said at least one radio head based on said downlink signal with timing based on said first clock signal.

13. The method of claim 5 wherein said communications link is selected from the group consisting of a T1 link and an E1 link.

14. The method of claim 5 wherein said at least one radio head belongs to a first radio head chain and wherein said downlink signal is a first downlink signal and wherein said downlink clock signal is a first downlink clock signal and wherein said central unit connects to a second radio head chain via a second communications link, said method further comprising:

using said first clock signal as a transmit clock for a third framer, said third framer transmitting a second downlink signal to said second radio head chain via said second communications link, said second downlink signal comprising a second downlink clock signal based on said first clock signal.

15. The method of claim 14 further comprising transmitting an RF signal by said first radio head chain based on said first downlink clock signal and transmitting an RF signal by said second radio head chain based on said second downlink clock signal.

16. The method of claim 5 wherein said central unit is a first central unit and further comprising:

using said first clock signal as a transmit clock for said first framer, said first framer transmitting to a second central unit based on said first clock signal;

supplying timing reference from said second central unit to at least one radio head associated with said second central unit;

transmitting an RF signal by said at least one radio head associated with said second central unit timing based on said first clock signal.

17. A method of supplying a timing signal from a central unit to at least one radio head connected to said central unit via a communications link, said method comprising:

receiving an external signal at a first framer of said central unit, said first framer generating a reference clock signal based on said external signal;

transmitting a radio head downlink signal from a second framer to said at least one radio head via said communications link using said reference clock signal as a transmit clock for said second framer.

18. The method of claim 17 wherein transmitting said downlink signal from said second framer to said at least one radio head via said communications link using said reference clock signal as said transmit clock for said second framer comprises generating an embedded clock signal for said downlink signal based on said reference clock signal.

19. The method of claim 18 further comprising:

receiving said external signal also at a third framer of said central unit, said third framer generating a third clock signal and extracting payload information based on said external signal;

receiving, with an oscillator in said central unit, said third clock signal and generating a fourth clock signal based thereon;

processing said payload information at said central unit based on said fourth clock signal; and thereafter, said second framer transmitting at least a portion of said payload information to said at least one radio head via said communications link with said embedded clock signal.

20. The method of claim 19 wherein said external signal comprises a network downlink clock signal having a long-term accuracy of not less than 0.016 parts per million and wherein said first framer generating said reference clock signal based on said external signal comprises said first framer generating said reference clock signal with a long-term accuracy of not less than 0.016 parts per million based on said external signal.

21. The method of claim 20 further comprising transmitting an RF signal by said at least one radio head based on said radio head downlink signal with timing based on said reference clock signal.

22. The method of claim 21 wherein said communications link is selected from the group consisting of a T1 link and an E1 link.

23. The method of claim 20 wherein said at least one radio head belongs to a first radio head chain and wherein said radio head downlink signal is a first radio head downlink signal and wherein said central unit connects to a second radio head chain via a second communications link, said method further comprising:

transmitting a second radio head downlink signal from a fourth framer to said second radio head chain via said second communications link using said reference clock signal as a transmit clock for said fourth framer.

24. The method of claim 23 further comprising transmitting an RF signal by said first radio head chain based on said first radio head downlink signal and transmitting an RF signal by said second radio head chain based on said second radio head downlink signal.

25. A communications assembly, comprising:

a central unit communicating with at least one radio head via a communications link;

said central unit comprising a first framer and a second framer;

said first framer receiving a signal generated external to said central unit and generating a reference clock signal based thereon;

said second framer receiving said reference clock generated by said first framer as a transmit clock and transmitting a radio head downlink signal to said at least one radio head based thereon;

said at least one radio head comprising a transceiver, said transceiver transmitting an RF communications signal based on said radio head downlink signal.

26. The assembly of claim 25 wherein said downlink signal comprises an embedded clock signal based directly on said reference clock generated by said first 1:5 framer.

27. The assembly of claim 26 wherein said communications link between said central unit and said at least one radio head is selected from the group consisting of a T1 link and an E1 link.

28. The assembly of claim 25 wherein said central unit further comprises an oscillator receiving a clock signal derived from said signal generated external to said central unit and generating a second clock signal based thereon, said central unit processing payload information associated with said signal generated external to said central unit based on said second clock signal, wherein said radio head downlink signal comprises at least a portion of said payload information.

29. The assembly of claim 25 wherein said at least one radio head belongs to a first radio head chain and wherein said radio head downlink signal is a first radio head downlink signal, said assembly further comprising:

a second radio head chain connected to said central unit via a second communications link; and wherein said central unit further comprises a third framer, said third framer receiving said reference clock generated by said first framer as a transmit clock and transmitting a second radio head downlink signal to said second radio head chain based thereon.

30. The assembly of claim 25 wherein said central unit is a first central unit and further comprising:

a second central unit connected to said first central unit via said first framer and having a radio head chain associated therewith;

said first framer transmitting said reference clock signal to said second central unit by using said reference clock signal as its own transmit clock; and said second central unit further comprising a third framer, said third framer receiving said reference clock via said first framer as a transmit clock and transmitting a second radio head downlink signal to said radio head chain based thereon.

* * * * *